United States Patent [19]
Lovette et al.
[11] Patent Number: 4,862,753
[45] Date of Patent: Sep. 5, 1989

[54] PROBE TIP APPARATUS

[75] Inventors: Spencer Lovette, Holliston; Peter Coassin, Harvard; Robert Karol, Marlborough; John Aho, Acton, all of Mass.

[73] Assignee: Millipore Corporation, Bedford, Mass.

[21] Appl. No.: 275,320

[22] Filed: Nov. 23, 1988

[51] Int. Cl.[4] .......... G01N 1/10

[52] U.S. Cl. .......... 73/863.23; 73/864.74; 73/864.72

[58] Field of Search .......... 73/863.85, 863.81, 863.23, 73/864.74, 864.72, 864.02, 864.01

[56] References Cited

U.S. PATENT DOCUMENTS 3,077,780 2/1963 Takatsy .......... 73/864.72
3,152,479 10/1964 Small .......... 73/863.85
3,252,331 5/1966 Lancaster .......... 73/864.72
3,430,497 3/1969 Tenczar .......... 73/864.01
3,985,032 10/1976 Avakian .......... 73/864.01

*Primary Examiner*—Hezron E. Williams
*Attorney, Agent, or Firm*—Andrew T. Karnakis; Paul J. Cook

[57] ABSTRACT

A probe apparatus for aspirating a liquid sample from a container including a probe and a probe tip. The probe tip has a free end including a plurality of sharp points and cutting edges formed by the juncture of exposed surfaces. The exposed surfaces have a length and shape which promote liquid movement by surface tension forces along the exposed surfaces. A filter is secured to the end of the probe tip and a passageway for liquid extends through the probe and probe tip.

7 Claims, 2 Drawing Sheets

PROBE TIP APPARATUS

BACKGROUND OF THE INVENTION

This invention relates to a probe apparatus useful in aspirating a liquid sample container. More particularly this invention relates to a probe apparatus having a probe tip which can completely remove a liquid sample from a suspension containing particulate matter and residue without clogging.

In DNA and peptide synthesis, nucleotides or amino acids are added sequentially to each other on a solid substrate. In the case of peptide synthesis, continuous flow processes of synthesis are available. In these process, a solid support such as polystyrene or polyamide-kieselguhr are positioned in the reaction column through which the reagents, including activated amino acid derivatives in the desired sequence, are passed. The excess reagents are flushed from the column by continuous flow of solvent.

The individual activated amino acid derivatives each are stored in a vial which is covered with a moisture-proof seal such as aluminum foil. It is necessary to utilize such a seal since moisture will deactivate the amino acids and prevent them from coupling to the peptide chain. In the synthesis procedure, the next amino acid to be coupled to the peptide chain is dissolved in a solvent mixed with a catalyst. Once the amino acids are mixed with the catalyst they are stable only for about 2-3 hours. Therefore, each amino acid solution must be prepared immediately prior to use. Approximately one half to one and a half hours is required to couple an amino acid to the peptide chain in the continuous process. Often, suspended particulate matter and residue is generated when the amino acids are dissolved. The particulates and residue must not be introduced into the reaction column because they block the column causing increased back pressure, reduced flow, and a failed synthesis. Therefore, prepared amino acid solutions must be filtered prior to being introduced into the reaction column.

Prior to the present invention, amino acid solutions were prepared manually and then reacted with the previously prepared peptide chain. Obviously, such a method is time consuming and very undesirable. An automated method has been proposed for preparing the amino acid solutions and utilizing the solutions sequentially to form the peptide chain. Automated apparatus exists which in a separate operation can remove a screw cap from a container or pierce a seal on a container containing the activated amino acid derivative. The amino acid is dissolved in a second operation. In a third operation, the amino acid solution is removed from the container by aspiration into a syringe. A filter is then positioned and, finally the solution is introduced through the filter into the reaction zone. This approach is complex, costly and unreliable.

It is desirable to remove substantially all of the amino acid solution from the vial containing the solution since the amino acids are quite expensive.

It would be desirable to provide a means for effecting continuous and automated peptide synthesis in a manner which utilizes substantially all of an amino acid reagent without introducing particulate matter or residue into the reaction column. In addition, it would be desirable to provide such a means wherein clogging with particulate matter and residue is prevented. Furthermore, it would be desirable to provide such a means which is self cleaning so it can be used for successive couplings without carrying contaminants from one amino acid preparation to the next and without requiring replacement of apparatus components such as filter elements during an automated peptide synthesis. Also, it would be desirable to eliminate the need for removing a container cap in order to form an amino acid solution and then subsequently removing the solution from a container in order to effect reaction. It would also be desirable to provide such a means which disperses liquid and gas to a sample container to enable dissolution and mixing.

SUMMARY OF THE INVENTION

In accordance with this invention, a probe apparatus is provided which is attachable to a fluid dispensing and aspirating means useful for delivering a solvent or gas into a sample container and delivering a liquid sample from a sample container to a reaction chamber. The probe apparatus includes a filter and a probe tip through which a path is provided for liquid and gas passage therethrough.

The filter, which is held in the probe tip, prevents particulates and residue in the sample container from being drawn into the probe or being introduced into the reaction chamber. The filter is positioned as the outermost element of the liquid flow path so that it prevents the probe from clogging. It aids complete removal of the liquid sample from the sample container through capillary action. Due to the filter position, the filter material characteristics and the probe geometry, the probe can be cleaned by back flushing with solvent.

The probe tip includes a plurality of joining surfaces adjacent to an outside surface of the filter. The intersection of the joining surfaces form a plurality of sharp points and cutting edges. The sharp points are positioned in essentially the same plane as the exposed lower surface of the filter or slightly above or below the plane of the exposed lower surface of the filter. In use, the sharp points and cutting edges pierce the sealed surface of a sample container as the probe extends toward the sample container and to the bottom surface of the sample container. When fully extended, the probe tip or exposed lower filter surface contacts the bottom surface of the sample container. Liquid or gas can be delivered to the sample container to dissolved and mix the contents of the container. The geometry of the joining surfaces, sharp points and cutting edges on the probe tip promote even distribution of liquid and gas as it is delivered to the sample container, thereby aiding complete mixing. The joining surfaces have a length and shape which promote liquid movement to the filter by surface tension forces along the surfaces. All of the liquid in the sample container can be aspirated through the filter and thence through the probe tip and directed to a reaction site without drawing particulates or residue into the probe or the reaction chamber.

DESCRIPTION OF SPECIFIC EMBODIMENTS

Figure 1:
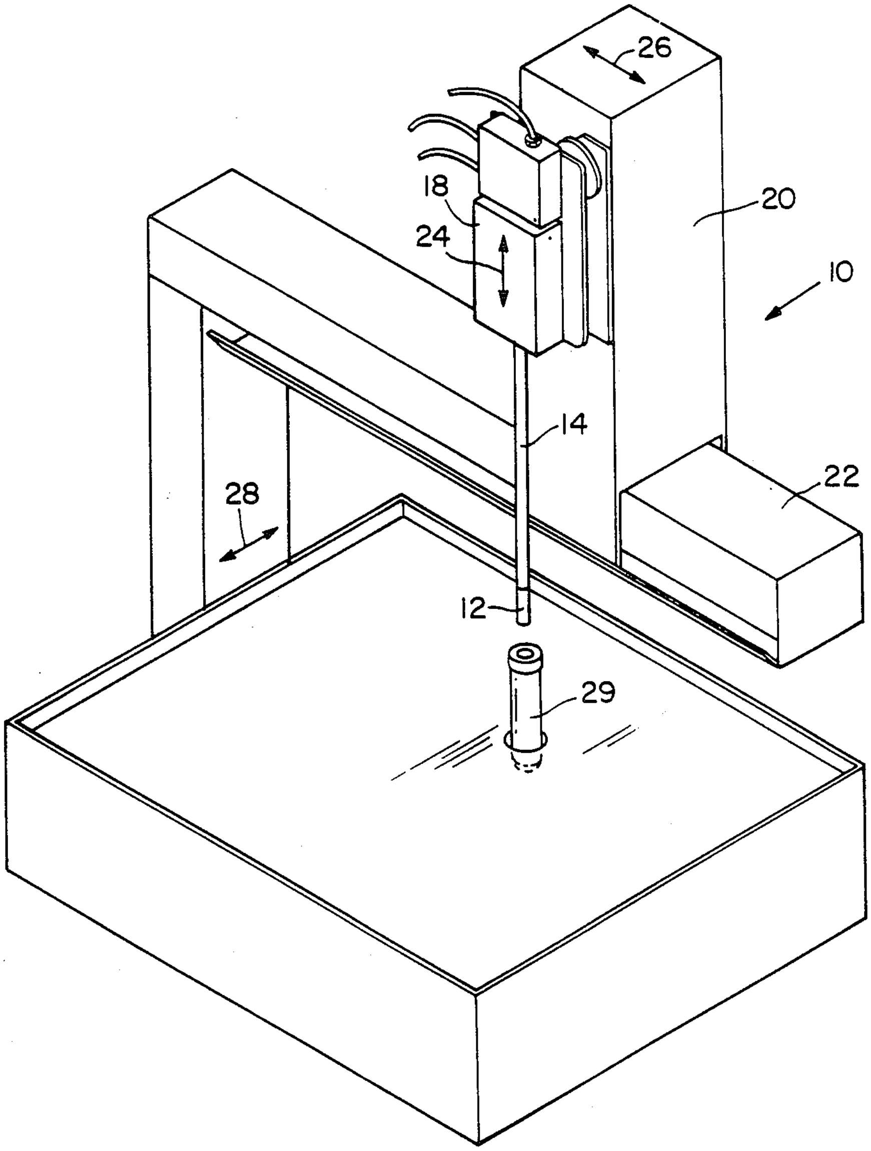
FIG. 1 is a perspective view of a probe assembly utilizing the probe tip of this invention.

The probe of this invention is generally cylindrical in shape and has a passageway which extends through the length of the probe to the probe tip. A recess is provided for fixing a filter centrally on the probe tip such that it protrudes from the bottom of the probe tip. The probe tip includes a plurality of joining surfaces which form a plurality of cutting edges and sharp points adjacent to an outside surface of the filter. The joining surfaces function as a means for promoting liquid movement to the filter by surface tension forces along the joining surfaces. The sharp points and cutting edges function as a means to pierce and cut away a portion of a seal for an opening of a container such as a vial with minimal force as the probe is extended through the seal and into a sample container. The sharp points are positioned in essentially the same plane as an exposed lower surface of the filter or slightly above or below the plane of the exposed lower surface of the filter. The geometry of the sharp points and cutting edges form an effective cutting profile. As the cutting profile advances through the seal of the vial, the exposed lower surface of the filter contacts the seal. With an ineffective cutting profile, once the filter contacts the foil, the filter would shield the foil from the cutting edges thereby preventing the probe form advancing through the foil seal. The filter does not shield the foil from the cutting edges with the effective cutting profiles used in this invention. The cutting profile enables the probe tip to continue cutting through the seal with minimal force beyond the position where the filter contacts the foil.

The joining surfaces can have any shapes which promote liquid movement by surface tension forces and form an effective cutting profile of sharp points and cutting edges along their intersections. The sharp points are defined by the intersection of two cutting edges or by the intersection of the joining surfaces. The cutting edges are defined by the interaction of two joining surfaces. Suitable examples of joining surface shapes include cylindrical sections, elliptical sections and isosceles triangular sections. The effective cutting profile of this invention has spaced-apart sharp points positioned around the exposed filter surface. The radial distance between the sharp points and the edge of the filter typically is between 1.5 mm to 3 mm, but can be smaller or larger if desired. The cutting edges recede upward away from the sharp points and the exposed filter surface. The distance between the sharp points and the point on the cutting edge furthest away from the sharp points in a vertical direction parallel to the main axis of the probe tip is typically between 0.5 mm and 2 mm so that liquid can migrate along the surfaces adjacent the cutting edges to the filter by surface tension. Openings formed around the circumference of the filter by the receding cutting edges when in contact with the vial bottom inner surface provide flow paths which promote even distribution of liquid and gas as it is delivered to the sample container.

The probe tip can be made of a metal such as stainless steel or a plastic composition so long as the metal or plastic composition promotes liquid movement by surface tension forces along the joining surfaces.

A filter element is centrally positioned at the end of the probe tip adjacent to the cutting edges and joining surfaces. It is positioned as the outermost element of the liquid flow path so that it prevents particulate matter and residue from entering and clogging the passages in the probe tip. The filter element is generally cylindrical in shape. The length of the flow path through the filter effects the resistance to flow. A minimum flow path length through the filter is desirable in some instances to provide easy aspiration of liquid from a particulate laden suspension without causing cavitation of the liquid in the probe or air leaks into the probe. The filter is about between 2 mm and 4 mm in length. About 0.5 mm to 1 mm of the length of the cylinder is exposed. The exposed lower circular surface of the filter element is positioned between 0 mm and 1 mm above or below the plane in which the sharp points lie. The filter can be formed of any material that has open pores of a size generally between about 80 microns and about 120 microns. It is preferred to utilize a filter material which is avidly wetted by the solvent, e.g., dimethylformamide.

Due to the filter position, the filter material characteristics and the probe geometry, the probe is self cleaning by back flushing with solvent.

In use, the probe tip construction of this invention is secured to a probe arm which includes a passageway for liquid movement therethrough. The probe arm is attached to means for reciprocating the arm in a vertical direction and means for delivering liquid and gas and aspirating a liquid sample through the interior passageways of the probe tip and the probe arm In order to initiate formation of the amino acid solution, the probe arm and probe tip are moved in a vertical direction downwardly so that a foil seal over the sample vial is contacted with the cutting edge on the probe tip in order to initiate the cutting of the foil which continues along the joining surfaces as the probe tip moves downwardly into the vial. When the lower filter surface extends slightly below the cutting edges, the foil first becomes stretched by virtue of contact with the filter surface when it is moving downwardly toward the foil and immediately thereafter is contacted with the cutting edges in order to rupture the foil. The probe is moved to the bottom of the vial so that the sharp points of the probe tip contact the bottom inner surface of the vial. Due to this contact, orifices are formed by the cutting edges and the bottom vial surface through which solvent can be delivered to the vial contents. Solvent for the amino acids is delivered through the probe arm and probe tip and, if necessary, the solvent and amino acid are mixed with an inert gas which is subsequently delivered, also through the probe arm and probe tip until a satisfactory amino acid solution is formed in the sample vial. The amino acid solution then is removed from the sample vial by moving the probe tip down into the sample container until the filter surface or cutting edges contact the bottom inside surface of the sample vial. When the filter surface contacts the vial surface directly, the liquid in the vial including all of the liquid in the bottom of the vial is passed through the filter upwardly through the probe tip passageway and probe arm passageway to be delivered to the reaction chamber. When the cutting edges contact the bottom surface of the vial directly, liquid in the bottom of the vial passes upwardly along the cutting edges and the joining surfaces by virtue of surface tension forces and are immediately passed through the filter. In either case, all of the liquid in the vial is removed from the vial so that all of the amino acid utilized in forming the solution is rendered available for reaction.

Referring to FIG. 1, the probe assembly 10 comprises a probe tip 12 and probe arm 14. The probe arm 14 is mounted through probe guide assembly 18 which, in turn, is mounted on arms 20 and 22 Guide assembly 18 and arms 20 and 22 are adapted to be movable by conventional electrical means (not shown) and are adapted to be movable in the directions shown by arrows 24, 26 and 28 respectively in order to position probe tip 12 over and into vial 29.

Figure 2:
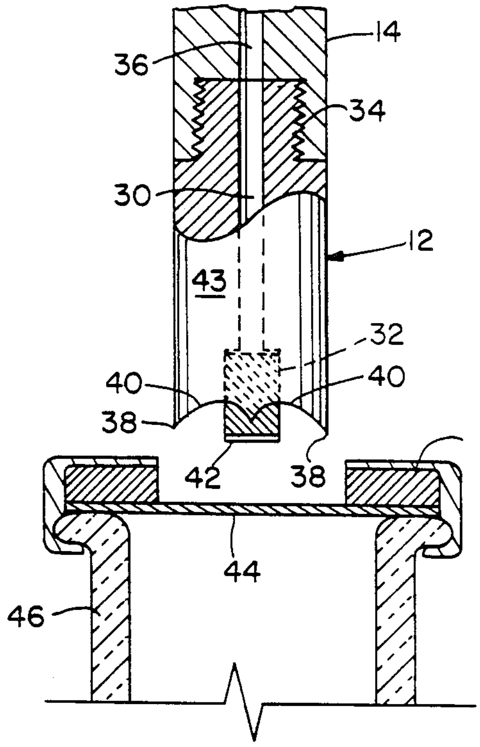
FIG. 2 is a cross sectional view of the probe tip of this invention.
Figure 3:
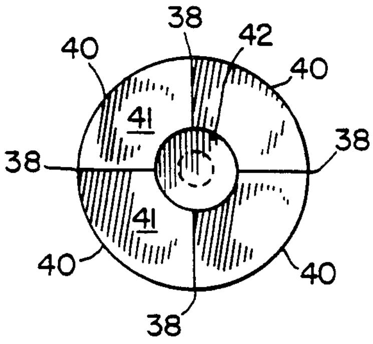
FIG. 3 is a bottom view of the exposed bottom surface of the probe tip of this invention.

Referring to FIGS. 2 and 3, the probe tip includes an interior passageway for liquid 30 and a filter element 32 which is secured to the tip 12 by any convenient means such as by screw threads. In addition, the probe and probe tip can be formed of unitary construction, if desired. The probe tip is secured to the probe arm 14 such as by screw threads 34. The probe arm 14 is also provided with an internal passageway for liquid 36. The probe tip 12 includes plurality of sharp points 38 and cutting edges 40 and cylindrical joining surfaces 41. The filter 32 has a lower posed filter surface 42. In use, when the sharp points 38 contact the foil 44 of the vial 46, the foil 44 is pierced and the piercing continues as the cutting edges 40 contact the foil 44. When the lower surface 42 of filter 32 first contacts the foil 44, the foil becomes stretched some what foil and pierce the foil in the manner set forth above. In order to remove all of the liquid from vial 46, the probe tip 12 is extended onto the bottom inner surface of the vial 46 until the filter surface 42 contacts or is immediately adjacent to the bottom surface of vial 46. Thereafter, the liquid sample is aspirated through liquid passageways 30 and 36 to a reaction zone (not shown).

Figure 4:
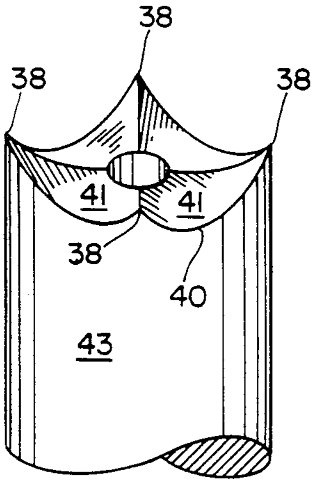
FIG. 4 is a view in elevation of the probe tip of this invention.

As best shown in FIG. 4, cutting edges 40 are defined by the intersection of surfaces 41 and 43 while sharp points 38 are defined by the intersection of adjacent surfaces 41 and surface 43.

We claim:

1. Probe apparatus including a probe and a probe tip and means for securing said probe tip to said probe, which comprises said probe tip.having a free end, said free end including a plurality of sharp points joined by exposed surfaces, said exposed surfaces having a length and shape which promote liquid movement by surface tension forces along said exposed surfaces, a filter secured to said probe tip adjacent said points and exposed surfaces such that liquid passing along said exposed surfaces can be passed through said filter, and a passageway for liquid extending through said probe tip to said filter.

2. The apparatus of claim 1 wherein said means for securing said probe tip to said probe comprises screw threads on an internal cylindrical surface extending through said probe tip.

3. The apparatus of claim 1 wherein said probe and probe tip are of unitary construction.

4. The apparatus of claim 1 wherein said exposed surfaces at said free end are shaped as a cylindrical section.

5. Apparatus for transferring a liquid sample from a sample container to a reaction zone which comprises a probe arm having a liquid passageway through said arm, the probe apparatus of claim 1 secured to one end of said arm and means for aspirating a liquid sample from said container to said reaction zone.

6. The apparatus of claim 5 wherein the exposed surfaces on said probe tip are shaped as a cylindrical section.

7. The apparatus of claim 5 wherein the filter on said probe tip is formed of a composition having open pores.

* * * * *